United States Patent [19]

Fisher

[11] 4,221,459
[45] Sep. 9, 1980

[54] ERECT IMAGE TELESCOPE OPTICAL SYSTEM

[76] Inventor: William E. Fisher, 335 John Street, Charlotte, Mich. 48813

[21] Appl. No.: 931,316

[22] Filed: Aug. 7, 1978

[51] Int. Cl.$^2$ ............................................ G02B 17/08
[52] U.S. Cl. .................................................... 350/55
[58] Field of Search .................... 350/27, 55, 48, 49, 350/17, 202, 203, 205

[56] References Cited

U.S. PATENT DOCUMENTS

| | | | |
|---|---|---|---|
| 620,978 | 3/1899 | Schupmann | 350/27 |
| 3,887,931 | 6/1975 | Baker | 350/55 |
| 4,101,195 | 7/1978 | Korsch | 350/55 |

*Primary Examiner*—Jon W. Henry
*Attorney, Agent, or Firm*—Ian C. McLeod

[57] ABSTRACT

A simplified catadioptric image erection telescope system of the Gregorian type and having two light axes is described. The system includes a first conventional magnifying refractor as an objective with plural elements which correct for chromatic, spherical and like aberrations and fosuses light on a first axis towards a smaller, flat surfaced, main mirror set at an angel alpha to a perpendicular to the mirror surface and to the focal axis of the objective which establishes an angle of inclination of the main mirror. The main mirror in turn reflects and directs the light on a second focal axis at an angle beta to the first axis where it focuses at F-2 in an inverted image in front of a still smaller secondary concave collecting mirror. The collecting mirror in turn reflects and focuses the light in an elongated focus on the second axis past an oval aperture in the main mirror where the erect image is formed at F-3. The erect image can be viewed with a second magnifying refractor or eyepiece mounted on the second axis as is conventionally used in telescopes or telephoto photographic lenses.

8 Claims, 3 Drawing Figures

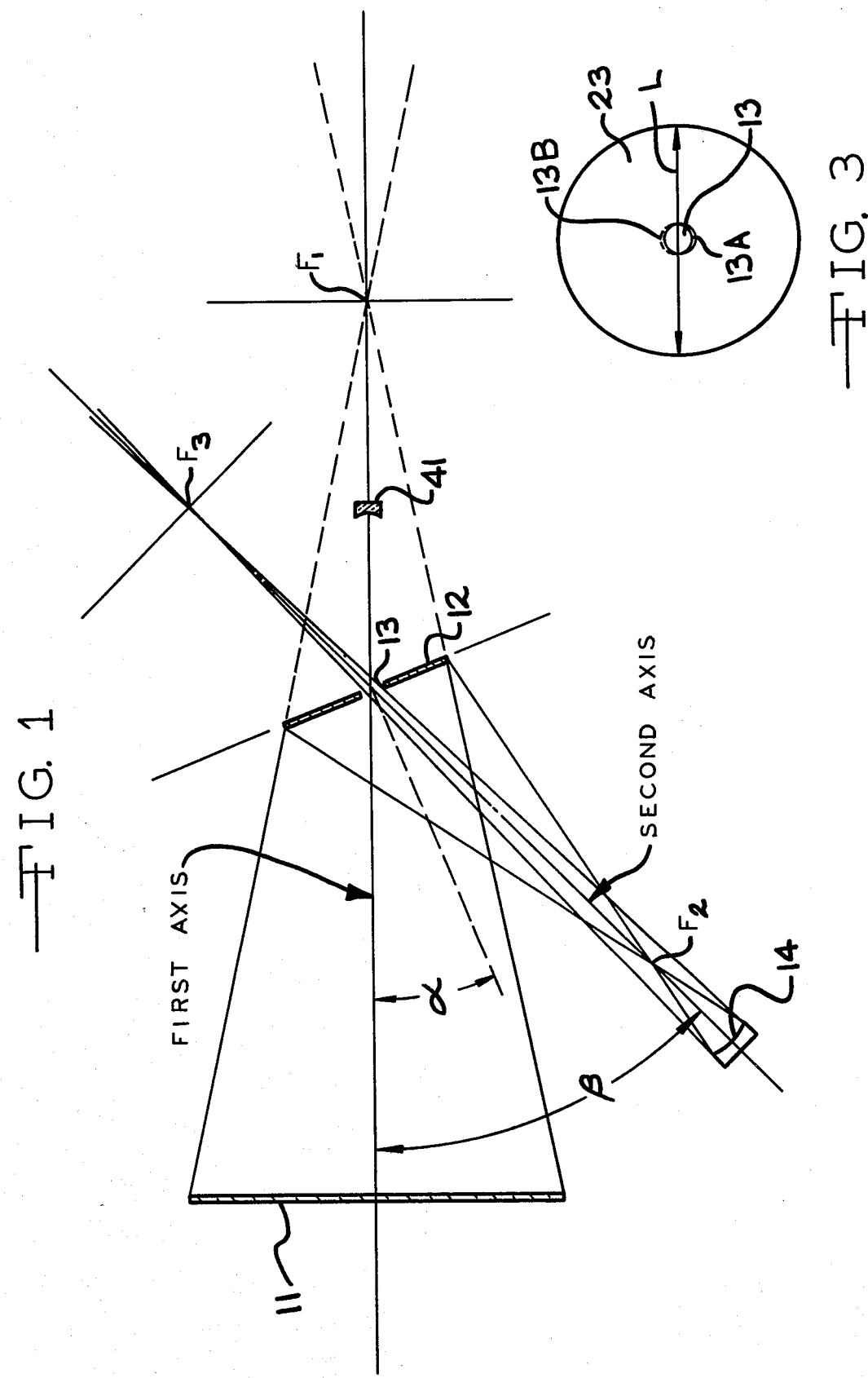

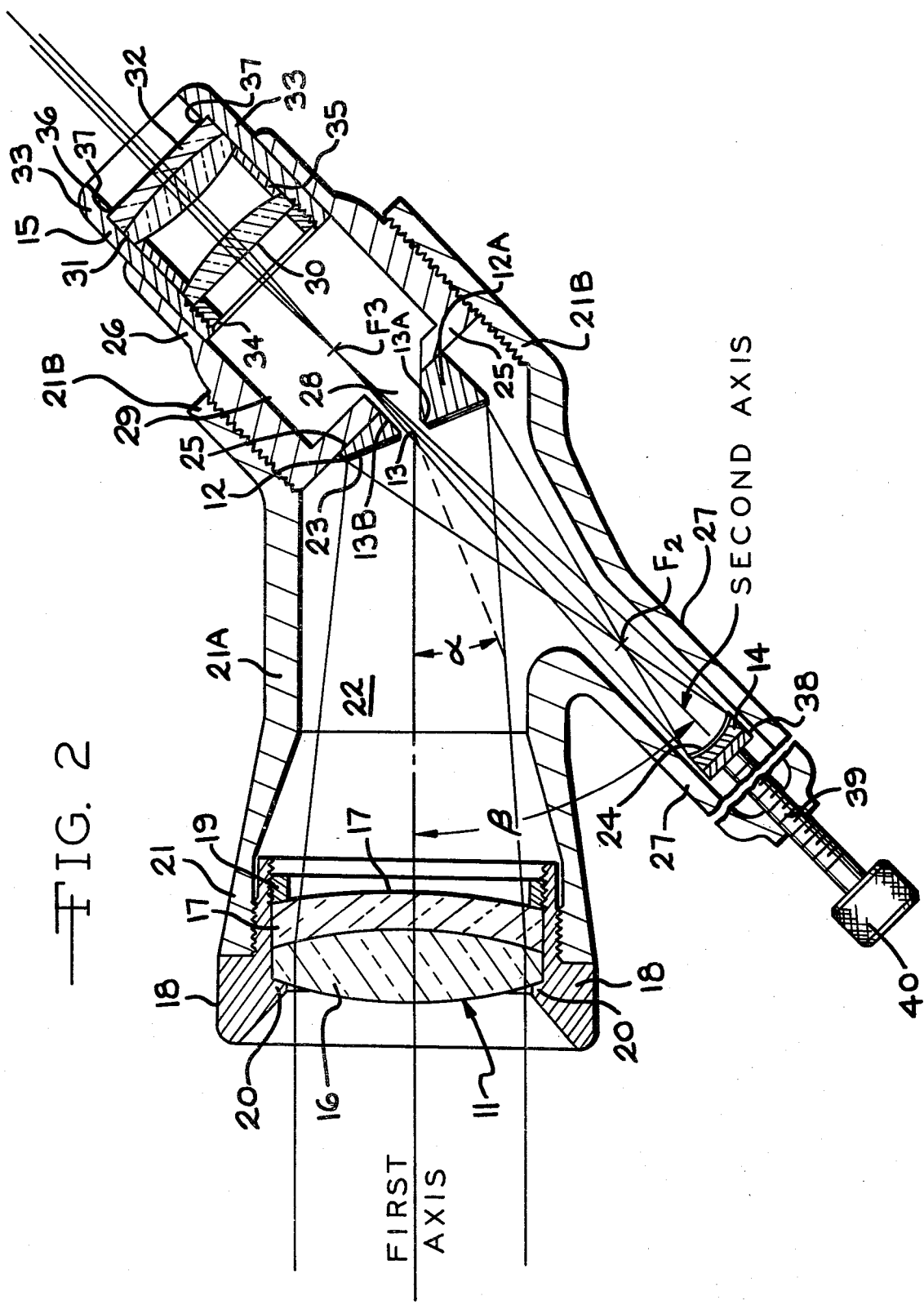

ERECT IMAGE TELESCOPE OPTICAL SYSTEM

BACKGROUND OF THE INVENTION

The present invention relates to a simplified catadioptric erect image telescope system of the Gregorian type where the primary or main mirror is flat surfaced with a central aperture and is positioned at the intersection of two axes of the system and where the collecting mirror is concave. In particular, the present invention relates to a preferred system where the main mirror is about one-half or less than the diameter of a plural element refractor which introduces light into the system on a first axis corrected for aberrations and focuses it towards the flat main mirror which is inclined to the first axis and which reflects the light on a second axis towards the concave secondary mirror in an inverted image after first focusing and then the concave mirror produces an erect image, elongated focus behind the aperture which can be viewed behind the aperture on the second axis with an eyepiece.

PRIOR ART

The prior art has described a variety of catadioptric telescope systems where matched combinations of complex surfaced convex and concave mirrors are used to reflect light towards an aperture where the image is viewed with a magnifying refractor. The systems are either regarded as Cassegrainian or Gregorian depending upon whether the secondary mirror is convex (Cassegrainian) or concave (Gregorian). U.S. Pat. Nos. 2,413,286; 2,504,383; 2,527,526; 2,685,820; 2,748,658; 2,817,270; 3,064,526; 3,274,886; 3,524,698; 3,527,526; 3,598,468; 3,827,778 and 3,897,133 describe such systems. These systems are believed to work well; however, they are relatively expensive to construct because of the need to carefully shape and mate pairs of aspheric, convex or concave reflective or refractive surfaces to eliminate aberrations.

OBJECTS

It is therefore an object of the present invention to provide a simply constructed and inexpensive catadioptric optical system of the Gregorian type which produces an erect image. It is further an object of the present invention to provide a system with a single concave collecting mirror preferably concavospherical in shape and a flat main mirror and which has minimal aberrations introduced by the light transmitting surfaces. These and other objects will become increasingly apparent by reference to the following description and to the drawing.

In the drawing:

FIG. 1 is a schematic view of the system illustrating the light paths along two axes in a telescope such as shown in FIG. 2 in relation to the mirrors and the refractor.

FIG. 2 is a front cross-sectional view of the preferred telescope system of the present invention particularly illustrating the mounting in a housing of the flat main mirror and of the concave collecting mirror in relation to a light focusing first refractor or objective.

FIG. 3 is a front view of the preferred main or flat mirror in the telescope of FIG. 2 illustrating the oval shaped aperture in the flat oval shaped main mirror.

GENERAL DESCRIPTION

The present invention relates to a catadioptric erect image telescope which comprises a flat main mirror with a reflecting surface area forming the mirror having a small central aperture; a first plural element magnifying refractor positioned on a first axis to refract light and to have a projected light focus behind the main mirror reflecting surface on line with the aperture from outside the system, the mirror being at an acute angle to the first axis such that the light is reflected on a second axis around the aperture; a concave surfaced collecting mirror centered on the second axis and spaced from the main mirror so as to focus light, which is reflected from the main mirror and focuses in front of the concave reflecting mirror in an inverted image formed solely by the light focusing of the first refractor as reflected from the main mirror, towards the aperture in the main mirror to a focus behind the aperture having an erect image; and means for detecting the erect image focused behind the main mirror along the second axis from outside the system positioned opposite the concave mirror on the second axis. The preferred system uses circular first and second refractors (which are either joined together or separated by a space) as well as preferably an oval flat mirror and a circular concave mirror, although other less conventional shapes can be used, such as a rectangular refractor so long as a satisfactory image is produced. The concave mirror is preferably concavospherical, but can be parabolic. Usually the gas space between the objective and the mirrors is filled with air; however, nitrogen or rare gases can be used.

Referring generally to FIGS. 1 and 2, light enters the system around the first axis, exits positive achromatic two refractory element objective 11, and proceeds toward the imaginary or projected focus F-1 shown in dotted lines in FIG. 1. Before focus F-1 is achieved the direction of the light is altered or deflected by a small (preferably approximately one-half of the objective diameter) plane or flat front mirrored surface main mirror 12 inclined at angle alpha and having a central oval shaped aperture 13 at the intersection with a second axis of the system. The mirror 12 surface is angled in respect to the objective 11 axis so as to establish the second axis which is at angle beta from the first axis, which angle is equal to the angle of incidence of the light. The angle of tilt alpha of the mirror is one-half of the angle beta of incidence. Focus then occurs before the reversed light reaches a concave mirror 14 at point F-2 and forms an inverted image. The inverted image then strikes a small spherical, concave mirror 14, which again reverses the direction of the light and provides a second elongated focus F-3 behind the aperture 13, whose image is erect. The aperture 13 is just large enough to allow the light rays to pass through the main mirror 12 on the way to F-3, where they can focus at the required distance behind the main mirror 12 and at the required or desired f/value. Thus the aperture 13 is at the intersection of the two axes. The erect image focus F-3 can be viewed through an adjustable magnifying refractor or eyepiece 15. The concave mirror 14 in this manner increases the effective focal length of the refractory objective 11. The system can be in the form of binoculars, a telescope or a telephoto lens for a camera.

SPECIFIC DESCRIPTION

As shown in FIG. 2, the refractory objective 11 is of the Fraunhofer type and is circular and includes a crown glass double convex magnifying lens or refractor 16 and a mating quartz or flint glass concave-convex (Meniscus) lens or refractor 17 mounted in a circular tubular holder 18. A threaded retainer ring 19 and lip 20 hold the objective 11 in place in the holder 18. The lenses 16 and 17 are constructed so as to substantially eliminate aberration in a manner which is well known to those skilled in the art. Since no chromatic aberration occurs with reflection by mirrors such as mirrors 12 and 14, the objective 11 is the only potential source of this aberration in the system and the correction by the objective 11 is carried throughout the system as if the focus was at F-1 (FIG. 1). Providing the mirrors 12 and 14 are properly aligned along the two axes, the objective 11 can also correct for coma and astigmatism.

The holder 18 is threadably mounted on a tubular housing 21 which is attached to tubular element 21A with angular tubular portion 21B and is internally coated so as not to reflect light as are all of the elements inside the gas space 22 except the reflecting surfaces 23 and 24 of mirrors 12 and 14. The holder 18 and the housing 21 and 21A are mounted so as to be concentric around the first axis. The mirror 12 is mounted on an angled mounting plate 12A at an angle of inclination alpha to a perpendicular line to the surface 23 and to the first axis. The plate 12A is mounted at an end 25 of a threadably connected extension 26 to the tubular portion 21B on the second axis which is at an angle beta from the first axis. As can be seen from FIGS. 1 and 2 the aperture 13 is centered on the intersection of the first and second axes. The concave mirror 14 is mounted around the second axis on an extension 27 of the housing 21A opposite the main mirror 12 in the gas space 22. The aperture 13 is preferably oval shaped as shown in FIG. 3 with chamferred portions 13A and 13B to prevent interference with the light on the first and second axis.

The end 25 of the extension 26 has an aperture 28 larger than the aperture 13 in the mirror 12 so as not to interfere with the light. The extension 26 is provided with a tubular opening 29 for slideably mounting the magnifying refractor 15 for movement along the second axis. The refractor 15 is shown as a Kellner eyepiece and includes single magnifying lens 30 and double lenses 31 and 32 mounted in a holder 33. The forward lens 30 towards the aperture 13 is held in place by a threaded ring 34 in the holder 33 and by a retaining spacer 35. The rear lenses 31 and 32 are held in place by the spacer 35 inside the holder 33 and lip 37 on eye portion 36 on the holder 33.

The concave mirror 14 is mounted on a plate 38 and a threaded shaft 39 is attached to the plate 38 and threaded through the extension 27 on the second axis. A knurled knob 40 is provided on the shaft 39 for changing the position of the concave mirror 14 along the second axis.

In general the focal value of the first refractory objective 11 is preferably between about 3 and 5 and the secondary concave mirror 14 produces an effective focal value of 10 or higher. The main mirror 12 and the concave mirror 14 have diameters sufficient to produce a useable erect image at F-3. The minimum diameter of the oval aperture 13 is preferably between 3 mm and 8 mm. In one preferred embodiment of FIG. 2, the diameter of the objective 11 was 40 mm with a focal value of about 3 and had an air space of about 76 mm to the aperture 13 of the main mirror 12, which was about 3.2 mm in minimum dimension L. The distance between the perture and the concave mirror 14 was about 76 mm. The angle alpha was about 22.5° and the angle beta was about 45°.

The preferred eyepiece for the system is a three (3) lens Kellner as shown in FIG. 2; however, a more expensive five or six lens Erfle eyepiece or other conventional telescope type eyepieces can be used. All of these variations are within the skill of the art.

The preferred system uses a secondary concave mirror which has an f value (ratio of diameter to focal point) of 10 or greater as shown in FIGS. 1 and 2. If the f value is at least f/10, spherical aberration of the secondary reflector is eliminated. As shown, the diameter of the secondary concave mirror need only be as large as necessary to focus the image from the main mirror without wasting light; however, a larger diameter mirror can be used. The secondary concave mirror must have a focus behind the aperture of the main mirror, which is shown in FIGS. 1 and 2.

Thus a catadioptric telescope system has been particularly described in which light enters and exits a standard two-element, (either joined or air-spaced) refracting objective (usually the Fraunhofer type, however any configuration that fulfills the usual demands of aberration correction will serve i.e. the optical system makes no special or custom demands on objective performance), and of a short focal value (preferably f/3 to f/5) and proceeds along its axis towards its initial focus. Before that focus occurs the light strikes a smaller, center perforated, plane, first surface mirror which is tilted or inclined at one-half the angle between the first and second axis at the midpoint of the angle of light incidence (where beta equals two times alpha), the light then strikes this mirror and is directed at an angle, along the newly created second axis, into an adjoining, smaller extension tube within which the initial or prime focus F-2 occurs. The then focused light proceeds somewhat further, in an inverted image, and strikes a smaller, first surface concavo-spherical mirror which is positioned perpendicular to the second axis to reflect light back on the second axis. On striking this reflector, the direction of the light is reversed along the second axis and in an elongated focusing action, (a ratio off the concave reflector to the second focus F-3 of at least 10, (f/10), or greater), travels up the connected tube, through the small aperture in the plane mirror and at a distance of at least one inch (25.4 mm) behind the plane reflector the light refocuses in an erect image. An eyepiece then detects the image of the second focus and presents it to the eye.

In use, the eyepiece is brought to the eye so that the system can be viewed along the second axis. The eyepiece by movement of the holder is focused along the second axis as with any other telescope and thus movement can be accomplished with a wide variety of means known to the prior art. Alternatively the objective can be moved along the first axis for focusing.

By moving the concave reflector to focus using the knob 40, (internal focusing), a very short minimum focus becomes possible. By placing a small negative lens 41 as shown in FIG. 1 behind the main mirror on the first axis to catch the rays which travel straight through the main mirror aperture unreflected, a simple Galilean telescope or finder telescope can be added.

The second axis inclination to the first axis (or the angle beta) can be adjusted between 25° and 90° so long as the main mirror maintains a strict one-half angle alpha of the angle beta between the first and second axis. There could be mechanical gearing (not shown) which allows the main mirror to move or tilt exactly one-half as much as the inclination of the second axis eyepiece assembly to provide an adjustable eyepiece inclination.

The major advantages of the system are: (1) short tube length with high magnification (high effective focal length); (2) an inherent erect image; (3) an inherent inclined eyepiece; and (4) ease and speed of production and a very modest price for the two conversion elements (the two small mirrors), which provide all of the above.

I claim:

1. A catadioptric erect image telescope system which comprises:
   (a) a flat surface main reflecting mirror having a small diameter oval shaped aperture and having an oval shaped reflecting surface forming the mirror;
   (b) a first plural element magnifying refractor positioned on a first axis to intercept and refract light from outside the system and have a projected light focus behind the main mirror reflecting surface on line with the aperture, the mirror being at an angle such that the light is reflected on a second axis around the aperture at an acute angle to the first axis, the refractor being circularly shaped around the first axis and being larger in circular diameter than the minimum oval diameter of the oval flat main mirror and the refractor including first and second lenses so as to correct for aberration and being spaced from the main mirror with a gas space therebetween and the angle between the axes being equal to the angle of light incidence off the main mirror;
   (c) a concave surface collecting reflecting mirror circularly shaped around the second axis and spaced from the main mirror so as to focus the light, which is reflected from the main mirror and focuses in front of the concave reflecting mirror in an inverted image formed solely by the light focusing of the first refractor as reflected from the main mirror, towards the aperture in the main mirror to a focus behind the aperture having an erect image, the concave mirror having a circular diameter around the second axis equal to or less than the minimum oval diameter of the main mirror; and
   (d) a second magnifying refractor for detecting the erect image focused behind the main mirror along the second axis and positioned opposite the concave mirror on the second axis.

2. The system of claim 1 wherein the concave collecting mirror has a concavospherical first surface mirror surface.

3. The system of claim 1 wherein the first refractor is composed on lenses which are joined together.

4. The system of claim 1 wherein the second magnifying refractor is selected from a Kellner or an Erfle eyepiece.

5. The system of claim 1 wherein the first refractor is a Fraunhofer objective.

6. The system of claim 1 wherein the first refractor is a Fraunhofer objective, wherein the second refractor is a Kellner eyepiece, wherein the collecting mirror has a concavospherical mirror surface wherein the main mirror is oval, and wherein the main mirror has a minimum dimension of the reflecting surface which is about one-half the diameter of the first refractor.

7. The system of claim 1 wherein the concave mirror has an f value of at least 10.

8. The system of claim 1 wherein the concave mirror position in adjustable along the second axis.

* * * * *